No. 753,694. Patented March 1, 1904.

UNITED STATES PATENT OFFICE.

LOUIS ANTOINE GARCHEY, OF PARIS, FRANCE.

MANUFACTURE OF GLASS STONE.

SPECIFICATION forming part of Letters Patent No. 753,694, dated March 1, 1904.

Application filed June 25, 1901. Serial No. 66,006. (No specimens.)

*To all whom it may concern:*

Be it known that I, LOUIS ANTOINE GARCHEY, a citizen of France, residing at 72 Boulevard Haussman, Paris, France, have invented certain new and useful Improvements in and Relating to the Manufacture of Glass Stone, of which the following is a specification.

This invention relates to certain new and useful improvements in the manufacture of glass stone described by me in Patents Nos. 587,809, 687,011, and 687,151, granted to me. According to the methods and processes set forth by these patents glass stone was prepared from crushed and powdered old glass placed in sand molds and subjected to the action of a suitable devitrifying kiln or furnace. Such processes or methods, however, presented some difficulty, as the glass did not readily lend itself to the molding operation and could only be placed in flat sand molds. The manufacture of the glass stone was therefore limited to the production of slabs, flags, tiles, and the like, and these were more or less ornamented by sinking or in relief by passing them through a hydraulic press.

Now according to my present invention I obviate this difficulty by using new glass, which I pour into suitable molds of thick metal, such as cast-iron, kept cool so that the fluid glass therein rapidly becomes tacky and pasty. The new glass, which I manufacture especially for this purpose, must be readily devitrifiable and the cost price of it should be very low. Any cheap vitrifiable materials, such as argillaceous or calcareous sands, may be added to its composition. Aluminium and lime are, in fact, the elements which facilitate the phenomenon of devitrification. In combination with the metal molds I employ a devitrifying kiln or furnace or any system with a hearth having, preferably, a circular movement. The use of this kiln or furnace enables the movable trays or supports described in my patents referred to to be dispensed with, as the operator can now place the sand molds directly upon the hearth at the initial or starting point of its movement. As soon as the glass which has been run into the metal mold has assumed a sufficient consistency the operator turns the mold upside down above the hearth, so as to cause the vitreous mass to fall into a mold of refractory material—such as sand, lime, plaster, talc, or the like of the desired form—placed on the hearth to receive it and to prevent it losing its shape.

The kiln or furnace is so constructed that the molds of refractory material containing the glass to be devitrified travel or circulate therein for the proper length of time necessary for the devitrification. From this fact I effect an important economy in fuel, as I no longer need to open the kiln or furnace doors twice for each mold, and thus by avoiding the entry of cold air the temperature of the kiln or furnace is maintained. At the same time the devitrification is effected under identical conditions for each mold, since they all traverse one after the other the same cycle in the same time, and by this means a greater regularity in the devitrification is obtained, and hence in the final product. When the sand mold containing the devitrified glass returns to its starting-point, the operator removes it and carries the devitrified mass to a hydraulic press, wherein it receives the exact form required.

Besides the great economy already pointed out the process further presents this important advantage over that disclosed in the patents referred to, and that is slabs, flags, or tiles having all the same thickness or depth can be obtained, which thickness or depth is exactly equal to the depth of the mold employed. Moreover, this process lends itself very readily to the ornamentation of the slabs or flags either by enameling or incrustation. For this purpose it is only necessary to sprinkle the bottom of the mold with enamel-powder or with glass fragments with which it is desired to cover the face of the slab, flag, or tile to be made.

The glass stone is capable of receiving with remarkable facility any galvanic deposit, and particularly that of copper, this latter adhering perfectly to the surface of the stone, as the same is more or less rough. The coating or plating of copper may be subsequently worked, polished, engraved, or otherwise treated, or it may be further covered with another galvanic deposit.

As the glass stone is an excellent electrical insulator, as its resisting qualities have placed it in the front rank among building materials, and as its mode of manufacture allows of any form being given to it, said glass stone or in general all devitrified glass when covered with a deposit of copper on certain of its parts constitutes a determinate body presenting in itself a novel use and of such nature as to give rise to numerous industrial applications, particularly for the manufacture of all articles or objects capable of conducting on certain of their parts and insulating on others, such as insulators for currents of high tension, condensers, electrodes, &c.

Having thus fully described my invention, what I claim as new, and desire to secure by Letters Patent, is—

A process of manufacturing glass stone consisting in running fluid devitrifiable glass into a cold mold and allowing it to set, then inverting the molded mass into a mass of refractory material, passing the two masses through a suitable temperature to devitrify the mass of devitrifiable material while inverted, and then molding the devitrified mass to the required form.

In testimony whereof I have hereunto set my hand in presence of two subscribing witnesses.

LOUIS ANTOINE GARCHEY.

Witnesses:
EDWARD P. MACLEAN,
ALFRED FREY.